United States Patent [19]

Bowen et al.

[11] Patent Number: 4,998,795
[45] Date of Patent: Mar. 12, 1991

[54] REFLECTION-LESS TERMINATOR

[75] Inventors: Terry P. Bowen, Etters; Paul R. Reitz, Palmyra; William K. Long, Bethel, all of Pa.

[73] Assignee: AMP Incorporated, Harrisburg, Pa.

[21] Appl. No.: 351,248

[22] Filed: May 12, 1989

[51] Int. Cl.$^5$ ................................................ G02B 6/36
[52] U.S. Cl. ................................ 350/96.20; 350/96.23
[58] Field of Search ................ 350/96.20, 96.21, 96.23

[56] References Cited

U.S. PATENT DOCUMENTS

| 4,186,999 | 2/1980 | Harwood et al. | 350/96.21 |
| 4,482,207 | 11/1984 | Thomas | 350/96.19 X |
| 4,634,214 | 1/1987 | Cannon, Jr. et al. | 350/96.20 |
| 4,773,725 | 9/1988 | Ashman et al. | 350/96.21 X |

OTHER PUBLICATIONS

Sankawa, Izumi, Satake, Toshiaki, Kashima, Norio, "Methods for Reducing Optical Fiber Connector Reflection Through Use of Index Matching Materials", Review of the Electrical Communications Laboratories, vol. 34, No. 6, 1986, pp. 703–709.

Kashima, Norio, Sankawa, Izumi, "Reflection Properties of Splices in Graded-Index Optical Fibers", Applied Optics, vol. 22, No. 23, Dec. 1, 1983, pp. 3820–3825.

Primary Examiner—William L. Sikes
Assistant Examiner—Phan T. Heartney

[57] ABSTRACT

A substantially reflection-less terminator 200,400 for an optical waveguide 102, 106 is disclosed. The termination is especially useful in preventing undesired reflections at the ends of unused fibers in an optical coupling device 100. In an illustrative embodiment, the terminator comprises a length of optical fiber 206. The front end of the fiber 206 is attached to a ferrule 222 for mating with a connector plug 10' attached to the end of the fiber to be terminated. The rear end of the fiber 206 is crushed at an angle and inserted into an index matching opaque adhesive material 230.

16 Claims, 2 Drawing Sheets

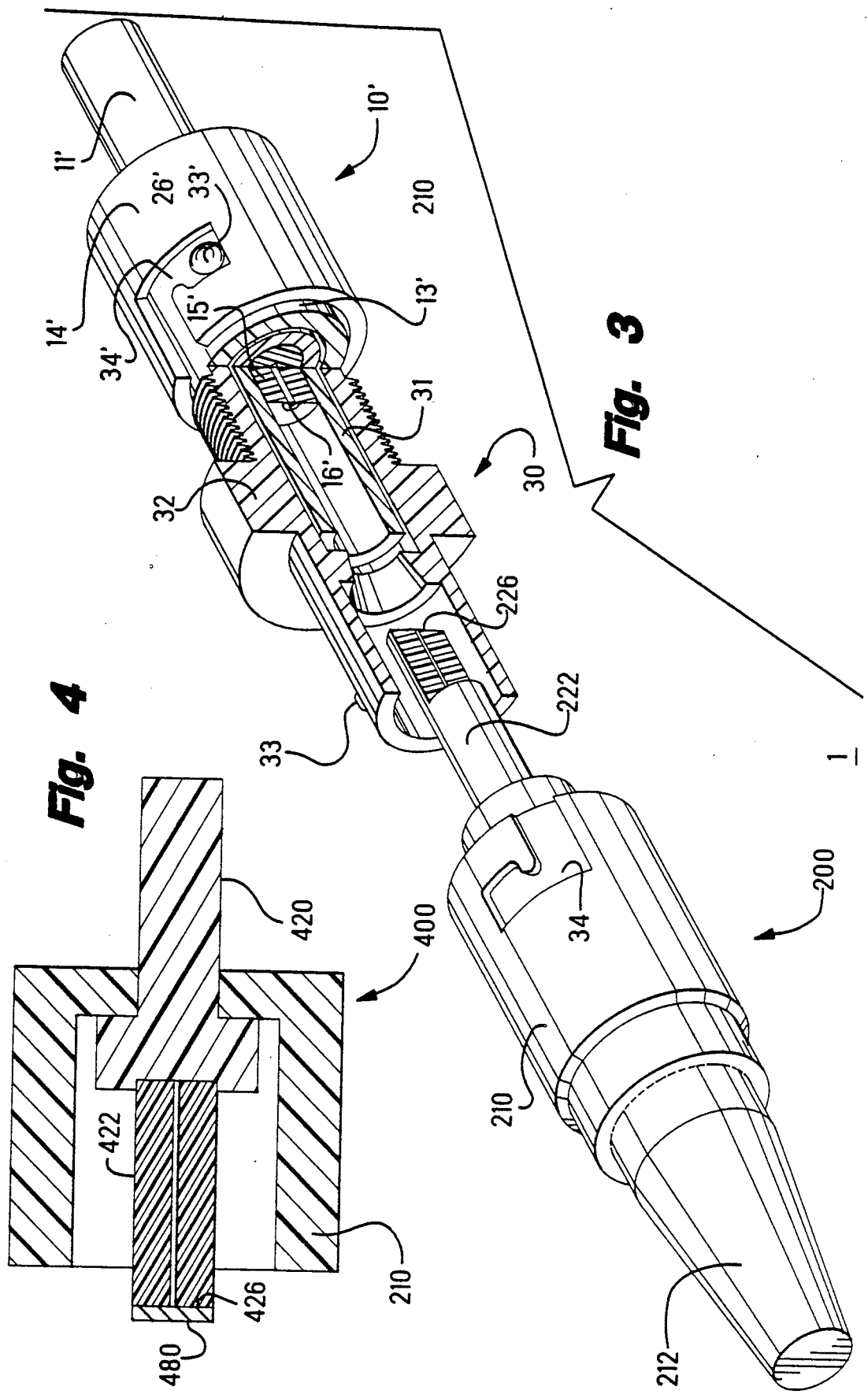

REFLECTION-LESS TERMINATOR

RELATED APPLICATION

A patent application entitled "Index Matching Film" and filed on even date herewith for Terry Bowen and Paul Reitz contains subject matter related to the subject matter of the present application. The above-identified patent application is assigned to the assignee hereof and is incorporated herein by reference.

FIELD OF THE INVENTION

The present invention relates to a reflection-less terminator for an optical waveguide.

BACKGROUND OF THE INVENTION

An optical star coupler is a device which comprises a plurality of input optical fibers, a coupling region, and a plurality of output optical fibers An optical star coupler typically operates to transmit a fraction of the optical power received at each input fiber to all output fibers. As a result, a star coupler is particularly useful for implementing an optical bus which enables a plurality of terminals to communicate with one another. A typical star coupler is an $8 \times 8$ device, i.e., it comprises eight input fibers and eight output fibers. However, in a typical application not all of the input fibers receive optical signals and not all of the output fibers are connected to other fibers for transmitting optical signals to remote locations. For example, to provide a $4 \times 4$ coupler, four of the eight input fibers are not utilized and four of the eight output fibers are not utilized.

Such unused fibers conveying output signals result in undesired reflections which might prove deleterious to the operation of the system in which the coupler is incorporated. Such reflections result from the fiber-air index of refraction mismatch at the ends of the unused fibers. Typically, the index of refraction mismatch at a glass fiber-air interface results in a reflection of four percent of the optical signal Consider, for example, a $4 \times 4$ coupler formed originally from an $8 \times 8$ star coupler having four unused input fibers and four unused output fibers. The optical signal arriving on each of the used input fiber is distributed by the coupling region to all eight output fibers. The radiation distributed to the used output fibers is transmitted via connector assemblies to other fibers for transmission to remote locations. At the ends of the four unused output fibers, reflections take place. The reflected radiation is then distributed by the coupling region to all the input fibers where reflection again takes place at the glass-air interfaces at the ends of the unused input fibers. This reflected radiation is then transmitted by the coupling region back to the output fibers, etc. Thus, in an optical coupler system, the glass-air interfaces at the ends of the unused fibers cause multiple reflections. For this reason, reflections at fiber end-air interfaces may be extremely deleterious to the performance of optical systems.

In view of the above, it is an object of the present invention to provide a termination for the ends of unused optical fibers of devices such as star couplers to eliminate deleterious reflections.

It is a further object of the invention to provide a termination for the ends of input and output fibers of an optical device which enables such fibers to be selectively utilized or not utilized depending on a particular application and which prevents deleterious multiple reflections of the type described above when input or output fibers are not utilized.

SUMMARY OF THE INVENTION

In accordance with the present invention, a substantially reflection-less termination for an optical fiber is provided. Illustratively, the termination comprises a short length of optical fiber, preferably of the same type of fiber as the fiber to be terminated. The length of fiber includes a front portion and a rear portion. The front portion of the fiber length is attached to a connector plug, such as a bayonet-type connector plug, which is used to physically contact the end of the fiber to be terminated. In this case the end of the fiber to be terminated is also attached to a bayonet-type connector plug. The rear portion of the fiber length is inserted into a strain relief boot which is filled with a substantially index matching opaque adhesive material. Accordingly, there are substantially no reflections at the fiber-adhesive material interface so that substantially all of the radiation propagating in the fiber length is transmitted into the opaque index matching adhesive where this radiation is absorbed. In an alternative embodiment of the invention, instead of using an opaque adhesive, a ball of cured UV sensitive cement may be formed over the rear portion of the fiber length and an opaque dye or other coating may be placed over the cured UV cement.

Illustratively, the end of the rear portion of the fiber length may be crushed at an angle using, for example, wirecutters before the rear fiber length portion is inserted into the opaque adhesive material. This insures that any light reflected as a result of a slight index mismatch between the fiber length and the adhesive is not reflected back along the fiber length.

A terminator formed in the above-described manner may be selectively secured to the end of a fiber to be terminated by mating the bayonet or other connector plug of the terminator with an appropriate connector assembly associated with the fiber to be terminated to provide the substantially reflection-less termination.

In an alternative embodiment of the invention, the end of an unused fiber of an optical coupler may be directly inserted into a strain relief boot containing a substantially index matching opaque adhesive to form a permanent reflection-less termination for the unused fiber.

In another alternative embodiment of the invention, a terminator incorporates a connector plug which connects by means of a connector receptacle to a connector plug associated with an unused fiber to be terminated. The connector plug of the terminator supports a ceramic ferrule on whose front end face an optically opaque film is formed.

BRIEF DESCRIPTION OF THE DRAWINGS

FIG. 3 illustrates the termination of FIG. 2 in more detail and shows how such a termination connects to an unused fiber of an optical coupling device.

FIG. 4 schematically illustrates an alternative termination for an unused optical fiber of the optical coupling device of FIG. 1, in accordance with an alternative illustrative embodiment of the invention.

DETAILED DESCRIPTION OF THE INVENTION

Figure 1:
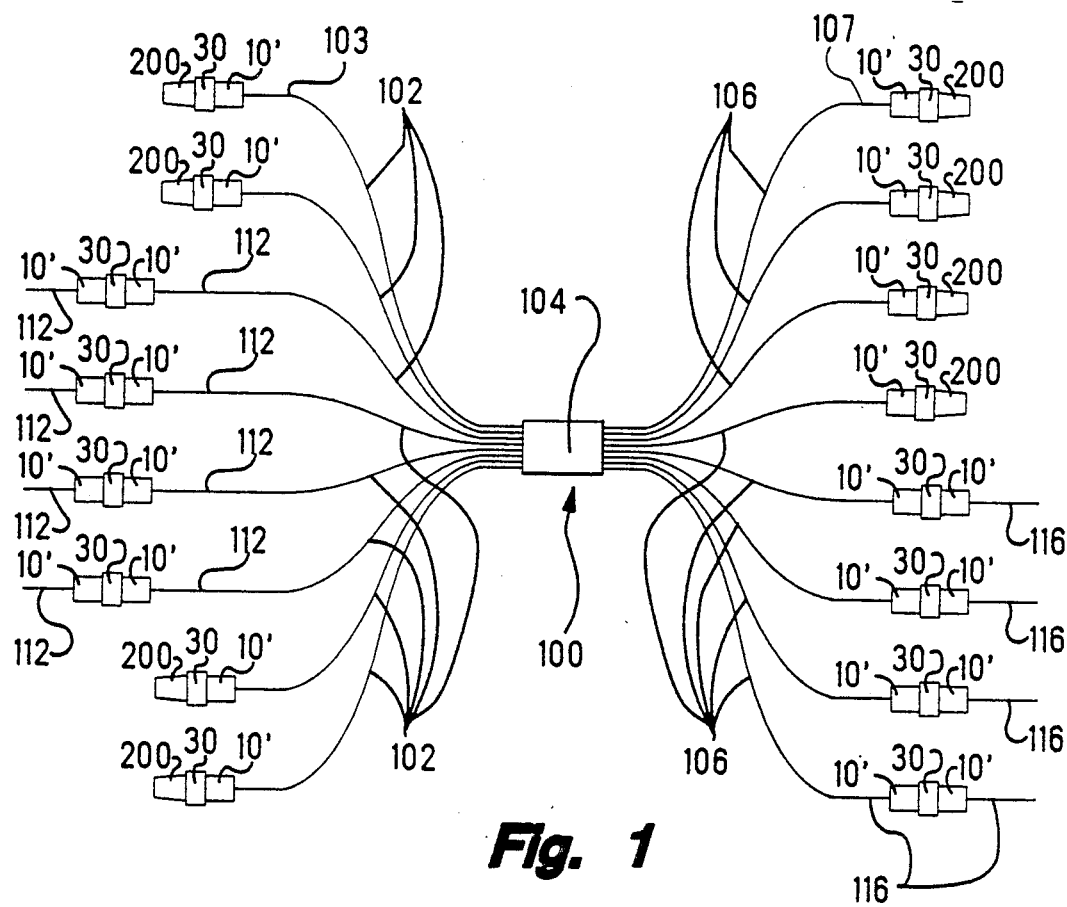
FIG. 1 schematically illustrates an optical coupling device comprising a plurality of input fibers, a plurality of output fibers and a coupling region, wherein some of the input and output fibers are not being utilized.

Turning to FIG. 1, an optical coupling device 100 is schematically illustrated. The coupling device 100 includes a plurality of input fibers 102, a coupling region 104 and a plurality of output fibers 106. Since eight light fibers 102 couple to eight fibers 106, an eight by eight coupling is achieved. The coupling device 100 operates to distribute a fraction of the optical power received via each input fiber to all of the output fibers. In a coupler with N output fibers, 1/N of the optical power received via each input fiber is distributed to each output fiber. In FIG. 1, four of the input fibers 102 receive optical signals via the fibers 112 which are connected to the appropriate ones of the fibers 102. The four unused input fibers 102 are terminated by corresponding terminators 200. Similarly, four of the output fibers 106 transmit optical signals to remote locations via the fibers 116 which are connected to the appropriate ones of the fibers 106. The four unused output fibers 106 are terminated by corresponding terminators 200.

Figure 2:
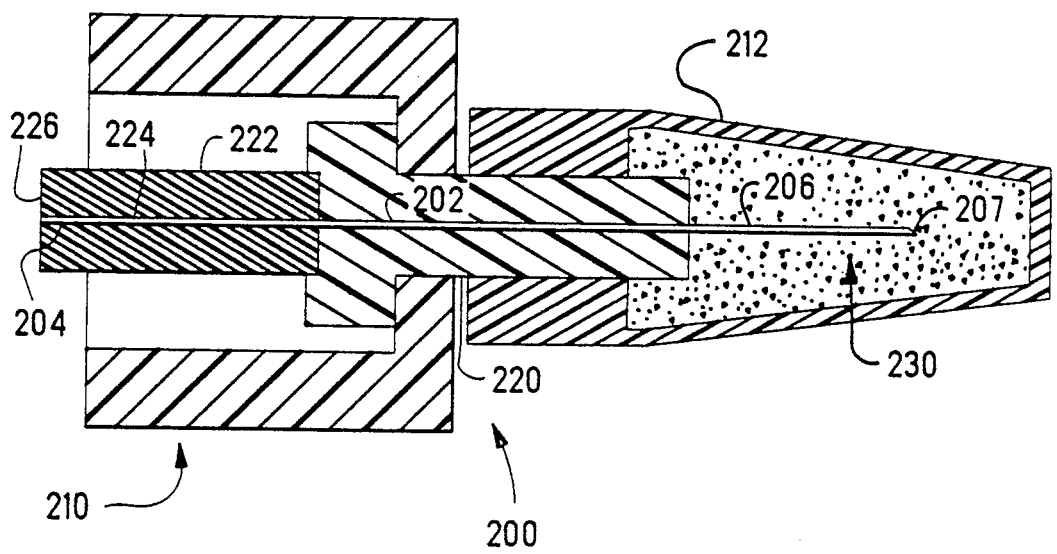
FIG. 2 schematically illustrates a termination for an unused optical fiber of the optical coupling device of FIG. 1, in accordance with an illustrative embodiment of the present invention.

In accordance with the present invention, a terminator 200, FIG. 2, terminates an unused fiber with substantially no reflections. As indicated above, in the absence of such a reflection-less terminator, deleterious reflections resulting from the index of refraction mismatch at the fiber end-air interface will significantly degrade performance.

Illustratively, the free ends 103 107 of each of the fibers 102, 106 is attached to a corresponding bayonet style connector plug 10' shown in FIG. 3. Connector plugs 101 are attached to respective ends of the fibers 102,112 and 106,116 to be connected. The bayonet style connection assembly is disclosed in Cannon, Jr., et al., U.S. Pat. No. 4,634,214 and in a co-pending U.S Pat. application Ser. No. 351,684, abandoned, entitled "Index Matching Film" filed on even date herewith for Terry Bowen et al. and assigned to the assignee hereof. The bayonet style connection mechanism is also discussed below.

The terminator 200 is illustrated in FIG. 2. Illustratively, the terminator 200 incorporates a bayonet type slotted coupling ring 210 which connects by means of a connector receptacle 30 to a bayonet connector 10', FIG. 1, associated with the unused fiber 102 or 116 to be terminated. The terminator 200 comprises a length of fiber 202. The fiber length 202 is preferably formed from the same type of fiber as the fibers 102, 106 to be terminated.

The fiber length 202 has a front portion 204 and a rear portion 206. The front portion 204 of the fiber length 202 is attached to the bayonet type connector plug designated 210. The rear portion 206 of the fiber length 202 is received in a housing in the form of a strain relief boot 212.

The terminator 200 comprises a connector body 220 which supports a ceramic ferrule 222 having a bore 224 in which the front fiber portion 204 is inserted. Illustratively, the tip 226 of the ferrule is polished for physical contact with a similar ferrule 15' comprising part of an opposing bayonet connector 10' attached to a free end of an unused fiber 102, 106 of FIG. 1.

The end 207 of the rear fiber portion 206 is crushed at an oblique angle using commercially available wirecutters. The rear fiber portion 206 is inserted into the strain relief boot 212 which is filled with an opaque adhesive material 230 such as a carbon-black filled epoxy. The material 230 has substantially the same index of refraction as the fiber length 202. Thus, there are substantially no reflections at the interface between the fiber length 202 and the material 230. Accordingly, substantially all optical radiation propagating in the fiber length 202 is transmitted into the material 230 where this radiation is absorbed. Because in actuality it is impossible to obtain a perfect index match, a small fraction of the optical radiation propagating in the fiber length 202 may be reflected at the interface with the material 230. For this reason, the fiber end 207 is an angled crushed fiber end. This prevents the small quantity of light reflected at the interface of the fiber length 202 and material 230 from propagating back along the fiber length 202. Instead of using a substantially opaque adhesive as the material 230, an index matching, optically transparent, UV curable adhesive may be used over the fiber end 206 if an opaque coating is formed over the ball of UV cement after curing.

As indicated above, the terminator 200 of FIG. 2 including the ring 210 may be selectively connected to the end of an unused fiber 102 or 106 via a bayonet connector 30, FIG. 3. In such a case, a bayonet connector 30 of receptacle form receives the bayonet connector plug 210 and the terminator 200 attached to the end of the fiber 102 or 106 to be terminated. If it is desired to reconfigure the coupling device 100 of FIG. 1, the reflection-less terminator 200 may be removed, and a previously unused input or output fiber 102 or 106 can then be connected to another optical fiber 112 or 116 using a bayonet connector 10'.

FIG. 3 shows how the terminator 200 is connected to an end of an optical fiber 102 or 106. The connector receptacle 30 receives plugs 10' of the kind previously described. Plug 10' is attached to the fiber cable 11' which illustratively comprises an unused optical fiber 102 or 106. Plug 10' comprises a ferrule 15', the housings 14', the springs 26', and the connector body 13'. The receptacle 3 includes alignment means 31 within the receptacle housing 32. Alignment means 31 is adapted to receive therein each of the ferrules 15',222 and to maintain them therein in substantially coaxial relationship, by keeping aligned the outer cylindrical surfaces of the two ferrules. Preferably, the alignment means comprises a split sleeve, made from either metal or plastic Illustratively, the end faces 16',226 of the ferrules 15',222 contact each other in the alignment means 31.

As can be seen from FIG. 3, the housings 14' of coupling rings 210 includes bayonet-type comprising slots 34,34' and camming pins 33,33' which project from the receptacle 30 and are received within slots 34,34' respectively.

An alternative terminator 400 is illustrated in FIG. 4. The terminator 400 of FIG. 4 incorporates a bayonet type connector plug 410 which connects by means of a connector receptacle 30, FIG. 3, to a bayonet connector 10' associated with an unused fiber 102 or 106 to be terminated. The terminator 400 includes a connector body 420 which supports a ferrule 422. A film 480, may be formed on the tip or front end face 426 of the ferrule 422 or may be an integral part of the ferrule The film 480 has substantially the same index of refraction as the optical fiber to be terminated and is illustratively formed from carbon-black filled polyurethane.

When the terminator 400 is connected to a receptacle 30 and a bayonet type plug 10' associated with a fiber 102 or 106 to be terminated, light propagating in the fiber to be terminated is absorbed by the film 480 which contacts the fiber 102 or 106 so that there are substantially no reflections from the end of the unused fiber 102 or 106. Note that in the terminator of FIG. 4, the film 480 replaces the fiber length 202, and the light absorbing material 230 of FIG. 2. Alternatively, the film 480 may be formed on the tip or end face 226 of the ferrule 222 of FIG. 2 for operation in conjunction with the fiber length 202, and the material 230.

Finally, the above-described embodiments of the invention are intended to be illustrative only. Numerous alternative embodiments may be devised without departing from the spirit and scope of the present invention.

We claim:

1. A terminator for terminating an unused first optical fiber to prevent undesired reflections, comprising:
   a length of optical fiber of the same type as the first optical fiber to be terminated, said length of optical fiber having a front portion and a rear end,
   a connector plug attached to the front portion of said length of optical fiber,
   said connector plug containing a material which covers the rear end of said length of optical fiber, and which has substantially the same index of refraction as said length of optical fiber, and which absorbs substantially all radiation transmitted by the rear end of said length of optical fiber, and which includes an opaque filler that absorbs radiation transmitted from the front portion to the rear end of said length of optical fiber.

2. The terminator of claim 1 wherein said connector plug is a bayonet style connector plug.

3. The terminator of claim 2 wherein said bayonet style connector plug includes a ferrule for receiving the front portion of said length of optical fiber.

4. The terminator claim 1 wherein said housing is formed by a strain relief boot.

5. The terminator of claim 1 wherein the rear end rear portion of the length of fiber is crushed at an oblique angle.

6. An optical coupling device comprising:
   a plurality of input fibers,
   a plurality of output fibers, and
   a coupling region located between said input fibers and said output fibers,
   at least one of said input and output fibers being unutilized, said unutilized fiber being attached to a first connector plug and being terminated by a terminator comprising:
   a length of optical fiber having a front portion and a rear portion,
   a second connector plug attached to the front portion of the length of fiber, and
   a housing for receiving the rear portion of the length of fiber, said housing including a material having an index of refraction which substantially matches the index of refraction of said length of fiber so as to prevent reflection of radiation at the end of the rear portion of said length of fiber,
   said optical device further including a connector receptacle for receiving said first and second connector plugs, so that said unused fiber and said fiber length are in optical communication.

7. A connector for contacting an end of an optical fiber of a second connector, comprising: a front end of the connector connected to the second connector and opposing the optical fiber, means at the front end of the connector contacting the optical fiber and for absorbing substantially all light transmitted by the optical fiber of the second connector, and including an opaque filler absorbing and preventing said light from being reflected back into the optical fiber.

8. A connector as recited in claim 7 wherein, said means comprises, a film of material having an optical index of refraction substantially the same as that of the optical fiber with said opaque filler for absorbing light.

9. A connector as recited in claim 7 wherein, said means comprises, an optical fiber of relatively short length having a front portion at the front end for contact with the first recited optical fiber, and having a rear portion crushed to prevent light from being reflected along the second recited optical fiber from the rear portion.

10. A connector as recited in claim 9 wherein, said crushed rear portion is at an angle.

11. A connector as recited in claim 9 and further comprising: said opaque filler covering the crushed rear portion for absorbing light.

12. A connector as recited in claim 11 wherein, said crushed rear portion is at an angle.

13. A connector as recited in claim 11 wherein, said means comprises, material adhered to the crushed rear portion having an index of refraction substantially the same as that of the crushed rear portion, and an opaque coating over the material.

14. A connector as recited in claim 13 wherein, said crushed rear portion is at an angle.

15. A connector as recited in claim 11 wherein, said second means comprises, material having in part a transparent filler adhered to the crushed rear portion and having an index of refraction substantially the same as that of the crushed rear portion, and having in part said opaque filler for absorbing light.

16. A connector as recited in claim 15 wherein, said crushed rear portion is at an angle.

* * * * *